(12) United States Patent
Tamura (10) Patent No.: US 9,690,253 B2
(45) Date of Patent: Jun. 27, 2017

(54) RATCHET MECHANISM AND IMAGE FORMING APPARATUS INCLUDING SAME

(71) Applicant: KYOCERA Document Solutions Inc., Osaka (JP)

(72) Inventor: Yuki Tamura, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/253,305

(22) Filed: Aug. 31, 2016

(65) Prior Publication Data

US 2017/0090402 A1 Mar. 30, 2017

(30) Foreign Application Priority Data

Sep. 28, 2015 (JP) ................. 2015-190096

(51) Int. Cl.
*G03G 21/16* (2006.01)
*F16D 41/18* (2006.01)
*F16D 121/14* (2012.01)

(52) U.S. Cl.
CPC ....... *G03G 21/1647* (2013.01); *F16D 41/185* (2013.01); *F16D 2121/14* (2013.01); *F16D 2200/0056* (2013.01)

(58) Field of Classification Search
CPC combination set(s) only.
See application file for complete search history.

(56) References Cited

U.S. PATENT DOCUMENTS

2007/0119280 A1* 5/2007 Takahashi ............... F16D 7/044
81/152

FOREIGN PATENT DOCUMENTS

JP 2006-276316 A 10/2006

* cited by examiner

*Primary Examiner* — Clayton E LaBalle
*Assistant Examiner* — Jas Sanghera
(74) *Attorney, Agent, or Firm* — Stein IP, LLC (57) ABSTRACT

A ratchet mechanism of the present disclosure includes a first ratchet gear, a second ratchet gear and a compression coil spring. The compression coil spring applies a force acting toward the first ratchet gear to the second ratchet gear. In the second ratchet gear, a cylindrical boss is formed. The center of gravity of the compression coil spring is arranged on the side of one end portion with respect to the center of the compression coil spring in a longitudinal direction. The compression coil spring is inserted into a boss from the side of the one end portion, and thus the center of gravity of the compression coil spring is arranged on the side of the first ratchet gear with respect to the tip end of the boss.

6 Claims, 6 Drawing Sheets

RATCHET MECHANISM AND IMAGE FORMING APPARATUS INCLUDING SAME

INCORPORATION BY REFERENCE

This application is based upon and claims the benefit of priority from the corresponding Japanese Patent Application No. 2015-190096 filed on Sep. 28, 2015, the entire contents of which are incorporated herein by reference.

BACKGROUND

The present disclosure relates to a ratchet mechanism which can transmit a rotational drive force only in one direction and an image forming apparatus including the same.

Conventionally, in an image forming apparatus such as a copying machine, a printer or a facsimile machine, various rotation members are used for units such as a drum unit, a development unit, a fixing unit and a transport unit. In order to rotate such rotation members, it is necessary to transmit a drive force to the individual units from a drive source such as a drive motor, and a plurality of gears are used as a drive transmission mechanism. As such gears, gears made of resin are often used in terms of cost, silence, light weight and the like.

Conventionally, as a mechanism for transmitting only a rotational drive force in one direction, a ratchet mechanism is known which includes a first ratchet gear, a second ratchet gear that can be moved in a direction in which the rotation shaft line of the first ratchet gear is extended and a compression coil spring that applies a force acting toward the first ratchet gear to the second ratchet gear. In the ratchet mechanism described above, on the center portion of the second ratchet gear, a boss is formed which is extended in a direction opposite to the first ratchet gear, and when the ratchet mechanism is assembled, the compression coil spring is held by being attached to the boss. Then, a side plate is pressed onto the compression coil spring from the side opposite to the second ratchet gear, and thus the compression coil spring is sandwiched between the side plate and the second ratchet gear.

SUMMARY

A ratchet mechanism according to one aspect of the present disclosure includes a first ratchet gear, a second ratchet gear and a compression coil spring. The second ratchet gear is rotated about the same rotation shaft line as the first ratchet gear, can be moved in a direction in which the rotation shaft line is extended and is coupled to the first ratchet gear or is disconnected therefrom. The compression coil spring applies a force acting toward the first ratchet gear to the second ratchet gear. In a center portion of the second ratchet gear, a cylindrical boss is formed which is extended in a direction opposite to the first ratchet gear. In one end portion of the compression coil spring, a close contact portion having two turns or more is formed. In a state where no load is placed on the compression coil spring, the center of gravity of the compression coil spring is arranged on the side of the one end portion with respect to a center of the compression coil spring in a longitudinal direction. The compression coil spring is inserted into the boss from the side of the close contact portion such that in the state where no load is placed on the compression coil spring, the center of gravity of the compression coil spring is arranged on the side of the first ratchet gear with respect to the tip end of the boss.

Further other objects of the present disclosure and specific advantages obtained from the present disclosure will become more apparent from the description of embodiments given below.

DETAILED DESCRIPTION

Embodiments of the present disclosure will be described below with reference to drawings.

First Embodiment

Figure 1:
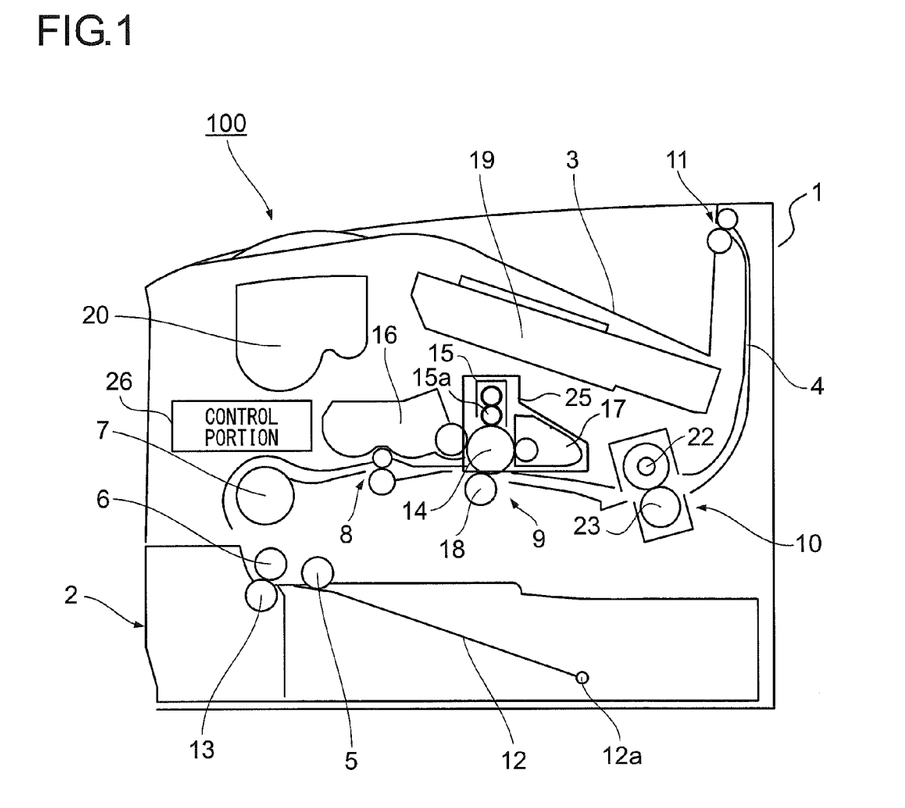
FIG. 1 is a cross-sectional view schematically showing a structure of an image forming apparatus including a ratchet mechanism according to a first embodiment of the present disclosure.

An image forming apparatus 100 which includes a ratchet mechanism 90 according to a first embodiment of the present disclosure will be described with reference to FIGS. 1 to 8. As shown in FIG. 1, in the image forming apparatus 100 (here, a monochrome printer), a paper feed cassette 2 is provided in which sheets (recording media) stacked in a lower portion of an apparatus main body 1 are stored. FIG. 1 is shown with the assumption that the left side is the front side of the image forming apparatus 100. Above the paper feed cassette 2, a sheet transport path 4 is formed which is extended substantially horizontally from the front to the back of the apparatus main body 1 and which is further extended upward to reach a paper ejection portion 3 formed in the upper surface of the apparatus main body 1, and along the sheet transport path 4, sequentially from the upstream side, a pickup roller 5, a feed roller 6, an intermediate transport roller 7, a registration roller pair 8, an image formation portion 9, a fixing unit 10 and an ejection roller pair 11 are arranged. Furthermore, within the image forming apparatus 100, a control portion 26 is arranged which controls the operations of the rollers, the image formation portion 9, the fixing unit 10 and the like.

In the paper feed cassette 2, a sheet stacking plate 12 is provided which is rotatably supported on the paper feed cassette 2 by a rotation pivot 12a provided at a back end portion in the sheet transport direction, and the sheets stacked on the sheet stacking plate 12 are pressed by the pickup roller 5. In the front side of the paper feed cassette 2, a retard roller 13 is arranged so as to be pressed onto the feed roller 6, and when a plurality of sheets are simultaneously fed by the pickup roller 5, the sheets are separated by the feed roller 6 and the retard roller 13, and only one uppermost sheet is transported.

Then, the transport direction of the sheet separated by the feed roller 6 and the retard roller 13 is changed by the intermediate transport roller 7 to the back of the apparatus, is transported to the registration roller pair 8 and is supplied by the registration roller pair 8 to the image formation portion 9 with timing adjusted.

The image formation portion 9 uses an electrophotographic process to form a predetermined toner image on a sheet, and is formed with a photosensitive drum 14 which is an image carrying member that is pivoted to rotate in a counterclockwise direction in FIG. 1, a charging device 15, a development unit 16 and a cleaning device 17 which are arranged around the photosensitive drum 14, a transfer roller (transfer member) 18 which is arranged opposite the photosensitive drum 14 through the sheet transport path 4, an exposure unit (LSU) 19 which is arranged above the photosensitive drum 14 and a neutralization device (not shown). Above the development unit 16, a toner container 20 for supplying toner to the development unit 16 is arranged. The photosensitive drum 14, the charging device 15 and the cleaning device 17 are integrally formed to constitute a drum unit (image carrying member unit) 25.

In the charging device 15, a charging roller 15a to which an unillustrated power supply is connected is provided, and the charging roller 15a is arranged so as to make contact with the photosensitive drum 14. When the photosensitive drum 14 is rotated, the charging roller 15a is brought into contact with the surface of the photosensitive drum 14 and is thereby driven to rotate. Here, a predetermined voltage is applied to the charging roller 15a, and thus the surface of the photosensitive drum 14 is uniformly charged.

Then, an electrostatic latent image based on image data input on the photosensitive drum 14 is formed by a laser beam from the exposure unit (LSU) 19, and the toner is adhered to the electrostatic latent image by the development unit 16 to form a toner image on the surface of the photosensitive drum 14. The toner image formed on the surface of the photosensitive drum 14 is transferred by the transfer roller 18 to a sheet which is supplied to a transfer position formed in a nip portion between the photosensitive drum 14 and the transfer roller 18.

The sheet to which the toner image is transferred is separated from the photosensitive drum 14 and is transported toward the fixing unit 10. The fixing unit 10 is arranged on the downstream side of the image formation portion 9 with respect to the sheet transport direction, the sheet to which the toner image is transferred in the image formation portion 9 is heated and pressurized by a heating roller 22 and a pressure roller 23 pressed onto the heating roller 22 included in the fixing unit 10 and thus the toner image transferred to the sheet is fixed. Then, the sheet subjected to the image formation processing and the fixing processing in the image formation portion 9 and the fixing unit 10 is ejected by the ejection roller pair 11 into the paper ejection portion 3.

On the other hand, the toner left on the surface of the photosensitive drum 14 after the transfer is removed with the cleaning blade (not shown) of the cleaning device 17. Then, the photosensitive drum 14 is charged again by the charging device 15, and thereafter image formation is performed in the same manner.

Figure 2:
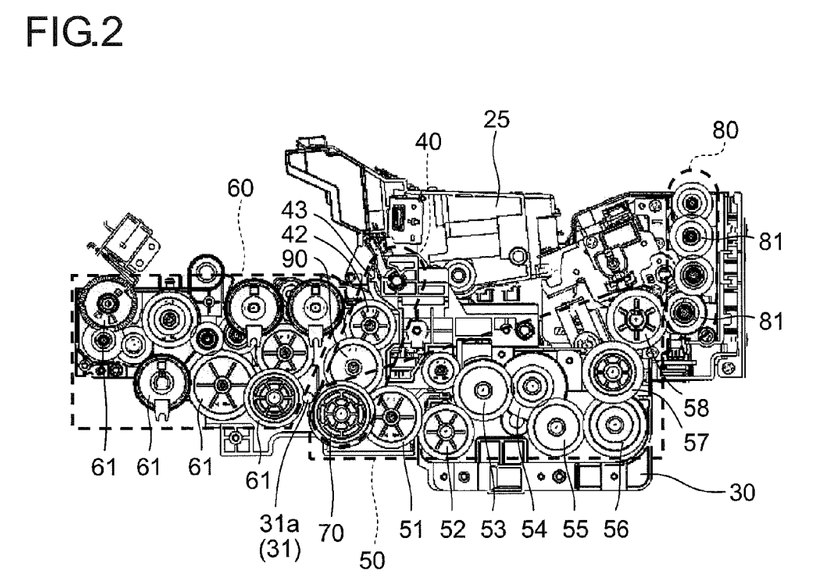
FIG. 2 is a side view showing a structure of the vicinity of the ratchet mechanism according to the first embodiment of the present disclosure.

On one side (the front side with respect to the plane of the sheet in FIG. 1) within the apparatus main body 1, as shown in FIG. 2, a frame 30 is arranged to which a large number of gears are rotatably attached. In the frame 30, a drive transmission train 40 which transmits a rotational drive force to the drum unit 25, a drive transmission train 50 which transmits the rotational drive force to the fixing unit 10 and a drive transmission train 60 which transmits the rotational drive force to the pickup roller 5, the feed roller 6, the intermediate transport roller 7, the registration roller pair 8, the development unit 16 and the like are provided. On the outer side (the front side with respect to the plane of the sheet in FIG. 2) of the frame 30, a drive motor (drive portion) 31 is provided which includes a gear portion 31a (upstream side gear) for transmitting the rotational drive force to the drive transmission trains 40, 50 and 60. The drive motor 31 is fixed to a side plate 32 (see FIG. 4) which is arranged in parallel to the frame 30 and which is made of sheet metal. The main body of the drive motor 31 is not illustrated.

The drive transmission train 40 includes a two-stage gear 70 which serves as a common gear shared by the drive transmission train 50, a ratchet mechanism 90, a gear 42 and a gear 43. The rotational drive force transmitted from the drive motor 31 to the two-stage gear 70 is transmitted to the photosensitive drum 14 and the like in the drum unit 25 through the ratchet mechanism 90, the gear 42 and the gear 43 which are sequentially engaged.

The drive transmission train 50 includes the two-stage gear 70 and gears 51 to 58. The rotational drive force transmitted from the drive motor 31 to the two-stage gear 70 is transmitted to the fixing unit 10 through the gears 51, 52, 53, 54, 55, 56, 57 and 58 which are sequentially engaged. A drive transmission train 80 which includes a plurality of gears 81 for transmitting the rotational drive force to the ejection roller pair 11 is connected to the gear 58.

The drive transmission train 60 includes a plurality of gears 61, and the rotational drive force from the drive motor 31 is transmitted through the gears 61 to the pickup roller 5, the feed roller 6, the intermediate transport roller 7, the registration roller pair 8, the development unit 16 and the like.

Figure 3:
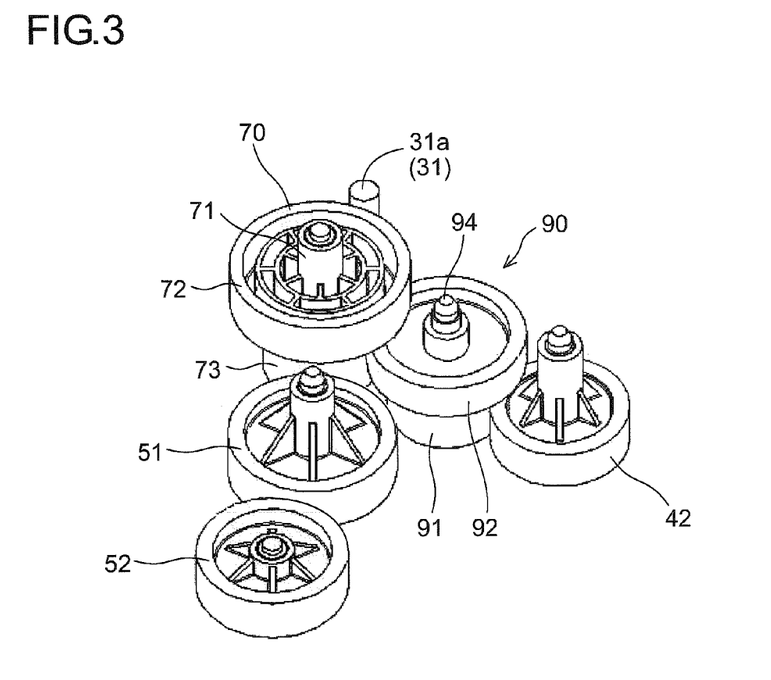
FIG. 3 is a perspective view showing the structure of the vicinity of the ratchet mechanism according to the first embodiment of the present disclosure.

The two-stage gear 70 is made of resin, and is formed by injection molding with a mold. As shown in FIG. 3, the two-stage gear 70 includes a cylindrical boss portion 71 which is formed in the center portion, a large-diameter portion 72 which is protruded outward of the boss portion 71 in a radial direction and a small-diameter portion 73 which is protruded outward of the boss portion 71 in the radial direction and whose outside diameter is smaller than that of the large-diameter portion 72.

In the outer circumferential portion of the large-diameter portion 72, a tooth portion is formed which is engaged with the gear portion 31a of the drive motor 31, and in the outer circumferential portion of the small-diameter portion 73, a tooth portion is formed which is engaged with the ratchet mechanism 90 of the drive transmission train 40 and the gear 51 of the drive transmission train 50.

Figure 4:
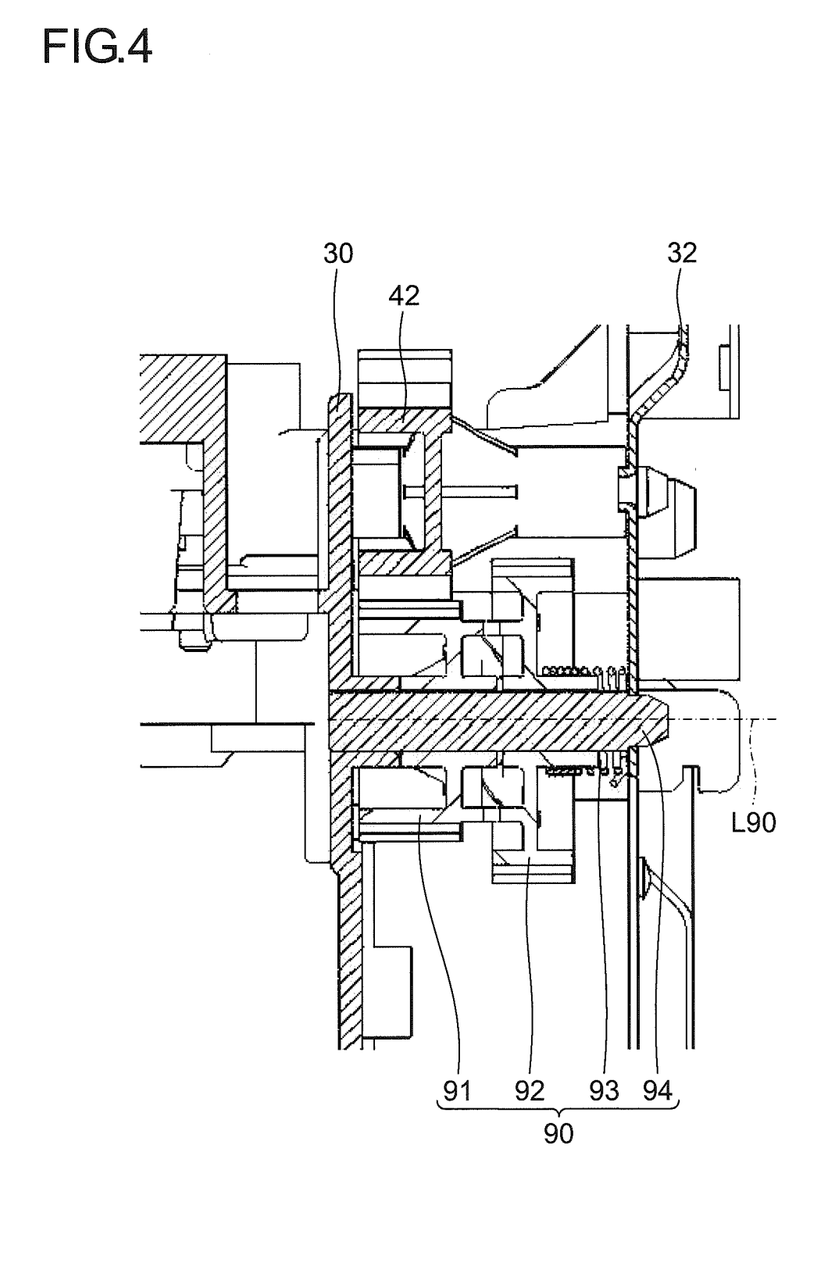
FIG. 4 is a cross-sectional view showing the structure of the vicinity of the ratchet mechanism according to the first embodiment of the present disclosure.

As shown in FIGS. 3 and 4, the ratchet mechanism 90 is formed with a first ratchet gear 91, a second ratchet gear 92 which is rotated about the same rotation shaft line L90 as the first ratchet gear 91 and which can be moved in a direction in which the rotation shaft line L90 is extended, a compression coil spring 93 which applies a force acting toward the first ratchet gear 91 to the second ratchet gear 92 and a shaft portion 94.

Figure 5:
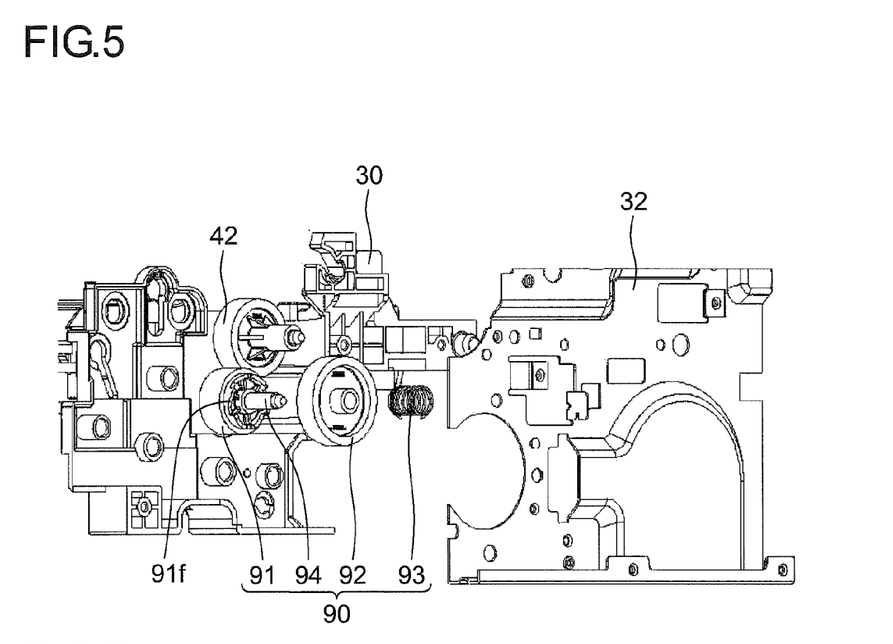
FIG. 5 is an exploded perspective view of the vicinity of the ratchet mechanism according to the first embodiment of the present disclosure.
Figure 6:
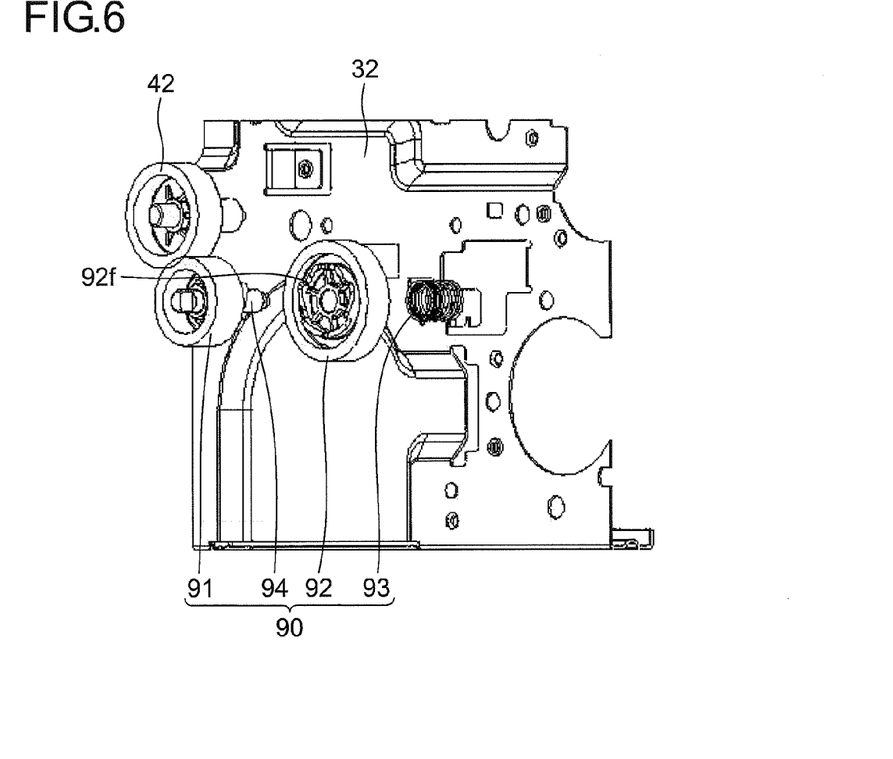
FIG. 6 is an exploded perspective view of the vicinity of the ratchet mechanism according to the first embodiment of the present disclosure.

As shown in FIGS. 4 to 6, both end portions of the shaft portion 94 are held by the frame 30 and the side plate 32, and the first ratchet gear 91, the second ratchet gear 92 and the compression coil spring 93 are sandwiched between the frame 30 and the side plate 32.

Figure 7:
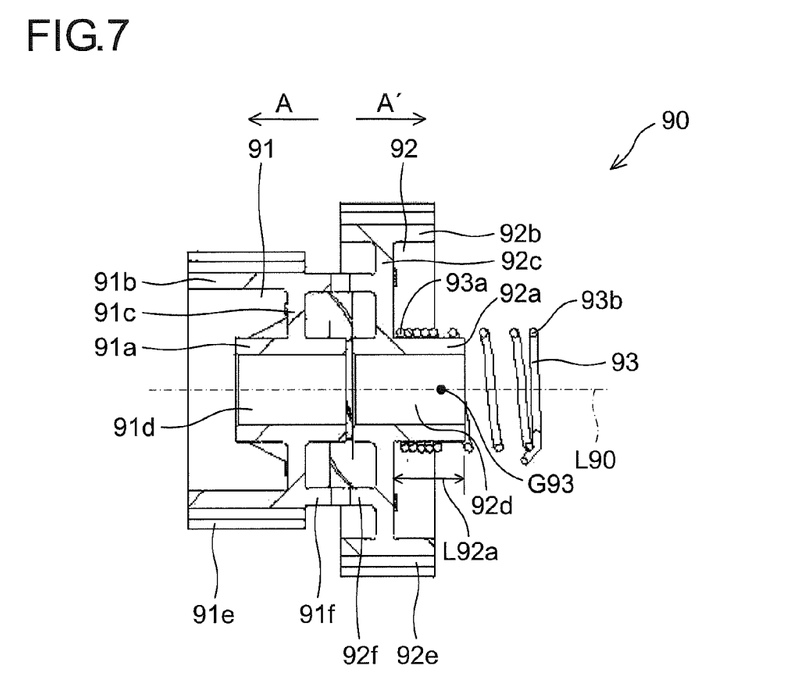
FIG. 7 is a cross-sectional view showing a structure of the ratchet mechanism other than a shaft portion according to the first embodiment of the present disclosure.

The first ratchet gear 91 is made of resin, and is formed by injection molding with a mold. As shown in FIG. 7, the first ratchet gear 91 includes a cylindrical boss 91a which is formed in the center portion and which is extended along the rotation shaft line L90, a rim 91b which is formed outward of the boss 91a in the radial direction coaxially with the boss 91a and a web 91c which couples the boss 91a and the rim 91b.

The boss 91a is formed so as to be protruded to both sides in the direction of thickness of the web 91c (direction which is indicated by arrows A and A', direction in which the rotation shaft line L90 is extended). In the center of the boss 91a, a through hole 91d into which the shaft portion 94 is inserted is formed. In the outer circumferential portion of the rim 91b, a tooth portion 91 e which is engaged with the gear 42 is formed. In a portion of the web 91c opposite the second ratchet gear 92, a ratchet tooth 91f is formed which is engaged with the second ratchet gear 92.

The second ratchet gear 92 is made of resin, and is formed by injection molding with a mold. The second ratchet gear 92 includes a cylindrical boss 92a which is formed in the center portion and which is extended along the rotation shaft line L90, a rim 92b which is formed outward of the boss 92a in the radial direction coaxially with the boss 92a and a web 92c which couples the boss 92a and the rim 92b.

The boss 92a is formed so as to be protruded to both sides in the direction of thickness of the web 92c (direction which is indicated by the arrows A and A'). In the center of the boss 92a, a through hole 92d into which the shaft portion 94 is inserted. The rim 92b is formed so as to have a diameter larger than that of the rim 91b, and in the outer circumferential portion of the rim 92b, a tooth portion 92e is formed which is engaged with the small-diameter portion 73 of the two-stage gear 70. In a portion of the web 92c opposite the first ratchet gear 91, a ratchet tooth 92f is formed which is engaged with the ratchet tooth 91f of the first ratchet gear 91. Hence, when the second ratchet gear 92 is rotated in a predetermined direction, the ratchet tooth 92f and the ratchet tooth 91f are engaged (coupled) with each other, and the rotational drive force is transmitted from the second ratchet gear 92 to the first ratchet gear 91. On the other hand, when the second ratchet gear 92 is rotated in the opposite direction, the ratchet tooth 92f and the ratchet tooth 91f are not engaged with each other (the coupling is cancelled), and the rotational drive force is not transmitted from the second ratchet gear 92 to the first ratchet gear 91.

Figure 8:
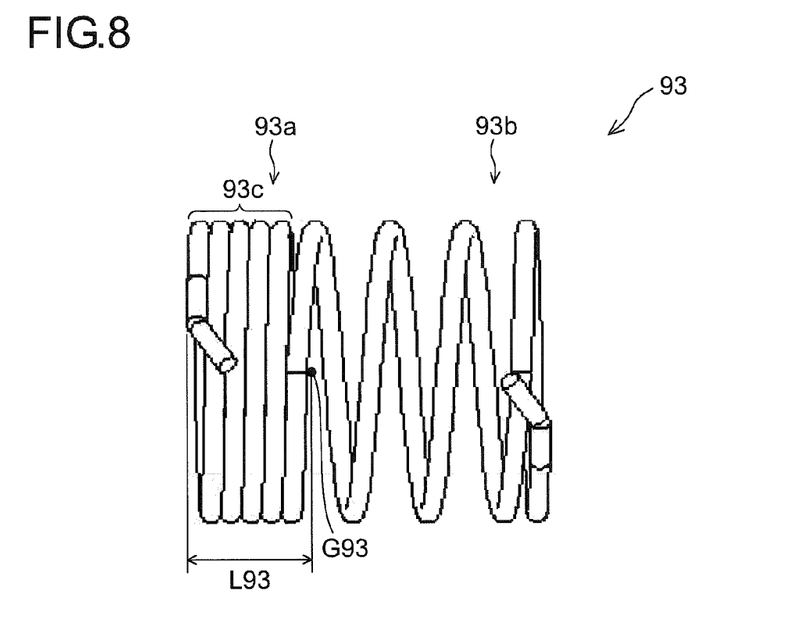
FIG. 8 is a side view showing a structure of the compression coil spring of the ratchet mechanism according to the first embodiment of the present disclosure.

In one end portion (end portion on the left side of FIG. 8) 93a of the compression coil spring 93, as shown in FIG. 8, a close contact portion 93c is formed in which a coil (wire member) is closely wound. The close contact portion 93c is formed with two turns or more (here, five turns). On the other hand, in the other end portion (end portion on the right side of FIG. 8) 93b of the compression coil spring 93, the coil (wire member) is wound so as not to be closely wound.

Since as described above, in the one end portion 93a of the compression coil spring 93, the close contact portion 93c is formed, and in the other end portion 93b, the close contact portion is not formed, in a state where no load is placed on the compression coil spring 93 (state where the compression coil spring 93 is not pressed onto the side plate 32), the center of gravity G93 of the compression coil spring 93 is arranged on the side of the one end portion 93a with respect to the center of the compression coil spring 93 in a longitudinal direction (left/right direction of FIG. 8). In the other end portion 93b of the compression coil spring 93, as compared with the one end portion 93a, the coil may be closely wound only a small number of turns (for example, one turn).

A distance L93 from the one end of the compression coil spring 93 to the center of gravity G93 in the state where no load is placed on the compression coil spring 93 is less than the amount L92a (see FIG. 7) of protrusion of the boss 92a of the second ratchet gear 92 in the direction indicated by the arrow A'. Hence, as shown in FIG. 7, when the compression coil spring 93 is inserted into the boss 92a from the side of the close contact portion 93c (the side of the one end portion 93a), in the state where no load is placed on the compression coil spring 93, the center of gravity G93 of the compression coil spring 93 is arranged on the side of the first ratchet gear 91 (the left side of FIG. 7) with respect to the tip end of the boss 92a (the right end of FIG. 7). The amount L92a of protrusion of the boss 92a in the direction indicated by the arrow A' is less than the half of the natural length (the length of the compression coil spring 93 in the state of no load in the direction indicated by the arrows A and A' (longitudinal direction)) of the compression coil spring 93.

As shown in FIG. 8, the one end and the other end of the coil (wire member) forming the compression coil spring 93 are bent toward the center side of the compression coil spring 93 in the longitudinal direction (the left/right direction of FIG. 8). The inside diameter of the compression coil spring 93 is larger than the outside diameter of the boss 92a.

When the ratchet mechanism 90 is attached to the frame 30, the shaft portion 94 of the ratchet mechanism 90 is attached to the bearing portion of the frame 30. Here, the shaft portion 94 is arranged horizontally. Then, after the first ratchet gear 91 is attached to the shaft portion 94, the second ratchet gear 92 is attached to the shaft portion 94.

Thereafter, the side of the one end portion 93a of the compression coil spring 93 is attached to the boss 92a of the second ratchet gear 92. Here, the center of gravity G93 of the compression coil spring 93 is arranged on the side of the first ratchet gear 91 (the left side of FIG. 7) with respect to the tip end of the boss 92a, and thus the compression coil spring 93 is prevented from being removed out of the boss 92a.

Then, the side plate 32 is arranged in a predetermined position, and the right end portion of the shaft portion 94 is inserted into the bearing portion of the side plate 32. In this way, the side plate 32 presses the other end of the compression coil spring 93 to the side of the second ratchet gear 92, and the compression coil spring 93 applies a force acting toward the first ratchet gear 91 to the second ratchet gear 92.

In the present embodiment, as described above, in the state where no load is placed on the compression coil spring 93, the center of gravity G93 of the compression coil spring 93 is arranged on the side of the one end portion 93a with respect to the center of the compression coil spring 93 in the longitudinal direction, and the compression coil spring 93 is inserted into the boss 92a from the side of the close contact portion 93c (the side of the one end portion 93a), and thus in the state where no load is placed on the compression coil spring 93, the center of gravity G93 of the compression coil spring 93 is arranged on the side of the first ratchet gear 91 with respect to the tip end of the boss 92a. In this way, even in a case where the boss 92a is formed to be shorter and where the second ratchet gear 92 is arranged in a state where the boss 92a is placed horizontally, when the compression coil spring 93 is inserted into the boss 92a from the side of the close contact portion 93c at the time of assembly of the ratchet mechanism 90, it is possible to reduce the removal of the compression coil spring 93 out of the boss 92a. Hence, in order to reduce the removal of the compression coil spring 93 out of the boss 92a, it is not necessary to add a temporary holding member for temporarily holding the compression coil spring 93 and to make the outside diameter of the boss 92a substantially equal to the inside diameter of the compression coil spring 93 to press the compression coil spring 93 into the boss 92a. In this way, it is possible to prevent the number of components from being increased, the number of steps in the assembly from being increased and the assembly operation from being complicated.

Since the center of gravity G93 of the compression coil spring 93 is arranged on the side of the one end portion 93a with respect to the center of the compression coil spring 93 in the longitudinal direction, even when the boss 92a is formed so as to be shorter than the half of the natural length of the compression coil spring 93, in a state where the compression coil spring 93 is inserted into the boss 92a from the side of the close contact portion 93c, the center of gravity G93 of the compression coil spring 93 can easily be arranged on the side of the first ratchet gear 91 with respect to the tip end of the boss 92a.

In the one end portion 93a of the compression coil spring 93, the close contact portion 93c having two turns or more is formed. In this way, in the state where no load is placed on the compression coil spring 93, the center of gravity G93 of the compression coil spring 93 can easily be arranged on the side of the one end portion 93a with respect to the center of the compression coil spring 93 in the longitudinal direction.

As described above, the one end and the other end of the coil (wire member) forming the compression coil spring 93 are bent toward the center side of the compression coil spring 93 in the longitudinal direction. In this way, the cut surfaces of the one end and the other end of the coil (wire member) forming the compression coil spring 93 are prevented from rubbing against the second ratchet gear 92 and the side plate 32, and thus it is possible to reduce the production of an abnormal noise between the compression coil spring 93 and the second ratchet gear 92 or the side plate 32 and to reduce the production of shavings from the second ratchet gear 92 or the side plate 32.

Since as described above, the second ratchet gear 92 is made of resin, the second ratchet gear 92 and the compression coil spring 93 are brought into smooth contact with each other. Hence, even when the compression coil spring 93 is not rotated together with the second ratchet gear 92, it is possible to easily reduce the production of an abnormal noise between the compression coil spring 93 and the second ratchet gear 92 and to easily reduce the production of shavings from the second ratchet gear 92.

As described above, the ratchet mechanism 90 is provided in the drive transmission train 40 which transmits the rotational drive force toward the photosensitive drum 14. In this way, it is possible to prevent the photosensitive drum 14 from being reversely rotated such as when the drum unit 25 is attached or removed, and thus it is possible to prevent the cleaning blade for removing the residual toner in the photosensitive drum 14 from being bent in the opposite direction.

Second Embodiment

Figure 9:
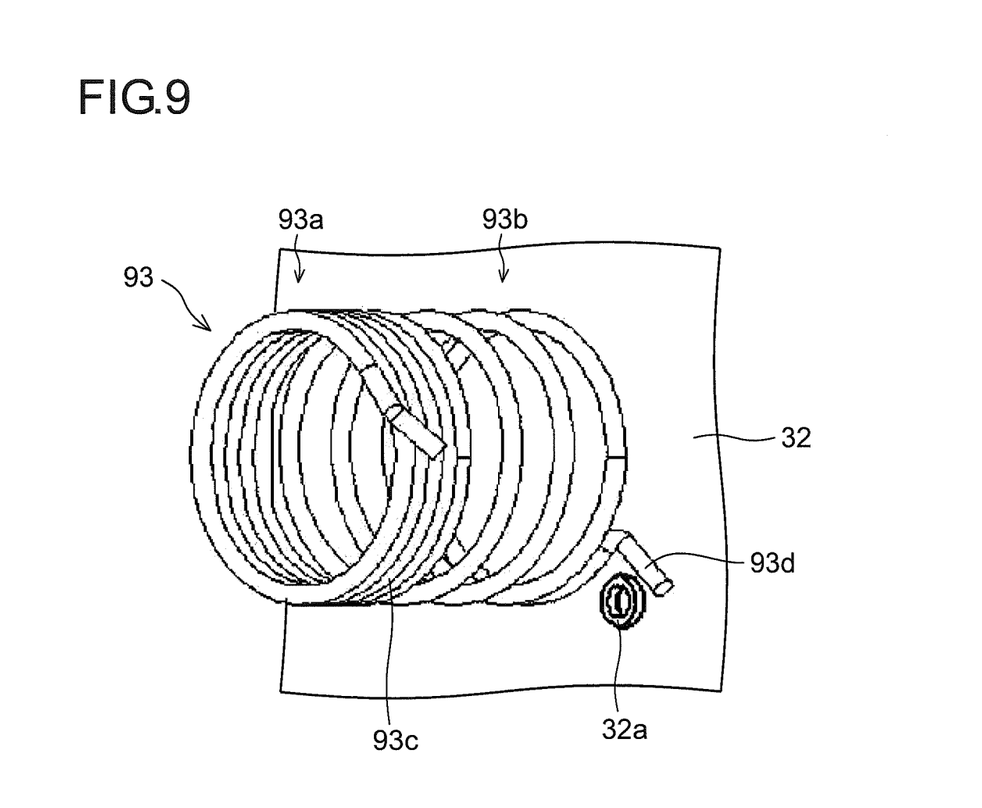
FIG. 9 is a perspective view showing a structure of the vicinity of the compression coil spring of a ratchet mechanism according to a second embodiment of the present disclosure.

In a second embodiment, as shown in FIG. 9, in the other end portion 93b of the compression coil spring 93, an engagement portion 93d is provided. The engagement portion 93d is formed by bending the other end of the coil (wire member) forming the compression coil spring 93 outward of the compression coil spring 93 in the radial direction.

On the side plate 32, an engaged portion 32a is provided which is protruded to the side of the frame 30 and is thereby engaged with the engagement portion 93d of the compression coil spring 93 so as to regulate the rotation of the compression coil spring 93. The engaged portion 32a is formed such as by burring processing, drawing processing or cutting and raising processing.

The other structures in the second embodiment are the same as in the first embodiment.

In the present embodiment, as described above, in the other end portion 93b of the compression coil spring 93, the engagement portion 93d is provided, and on the side plate 32, the engaged portion 32a is provided which is protruded to the side of the frame 30 and is thereby engaged with the engagement portion 93d so as to regulate the rotation of the compression coil spring 93. In this way, it is possible to reduce the rotation of the compression coil spring 93 together with the second ratchet gear 92, and thus it is possible to reduce the production of an abnormal noise caused by the rubbing of the compression coil spring 93 against the side plate 32 and to reduce the production of shavings from the side plate 32. Since an abnormal noise produced when the compression coil spring 93 rubs against the side plate 32 made of sheet metal is greater than an abnormal noise produced when the compression coil spring 93 rubs against the second ratchet gear 92 made of resin, it is particularly effective to reduce the rotation of the compression coil spring 93 together with the second ratchet gear 92.

The other effects in the second embodiment are the same as in the first embodiment.

The embodiments disclosed herein are to be considered in all respects as illustrative and not restrictive. The scope of the present disclosure is indicated not by the description of the embodiments discussed above but by the scope of claims, and meanings equivalent to the scope of claims and all modification within the scope are included.

For example, although the example where the present disclosure is applied to the monochrome printer is described, the present disclosure is not limited to this example. It is needless to say that the present disclosure can be applied to various image forming apparatuses, such as a color printer, a monochrome copying machine, a color copying machine, a digital multifunctional machine, a facsimile machine and the like, which include a ratchet mechanism that can transmit a rotational drive force only in one direction.

Although in the embodiments described above, the example where the present disclosure is applied to the ratchet mechanism 90 which transmits the rotational drive force toward the drum unit 25, the present disclosure is not limited to this example, and the present disclosure may be applied to a ratchet mechanism which transmits a rotational drive force toward another drive unit.

Although in the embodiments described above, the example where the shaft portion 94 of the ratchet mechanism 90 is formed separately from the first ratchet gear 91 and the second ratchet gear 92 is described, the present disclosure is not limited to this example, and the shaft portion 94 may be integrally formed with the first ratchet gear 91 or the second ratchet gear 92.

For example, although tin the second embodiment described above, the example where the other end of the coil (wire member) forming the compression coil spring 93 is bent outward of the compression coil spring 93 in the radial direction is described, the other end of the coil (wire member) forming the compression coil spring 93 may be bent inward of the compression coil spring 93 in the radial direction. This is also true for the one end and the other end of the coil (wire member) forming the compression coil spring 93 in the first embodiment.

Configurations obtained by combining, as necessary, the configurations of the embodiments and the variations described above are also included in the technical range of the present disclosure.

What is claimed is:

1. A ratchet mechanism comprising:
    a first ratchet gear;
    a second ratchet gear which is rotated about a same rotation shaft line as the first ratchet gear, which can be moved in a direction in which the rotation shaft line is extended and which is coupled to the first ratchet gear or is disconnected therefrom; and
    a compression coil spring which applies a force acting toward the first ratchet gear to the second ratchet gear,
    wherein in a center portion of the second ratchet gear, a cylindrical boss is formed which is extended in a direction opposite to the first ratchet gear,
    in one end portion of the compression coil spring, a close contact portion having two turns or more is formed,
    in a state where no load is placed on the compression coil spring, a center of gravity of the compression coil spring is arranged on a side of the one end portion with respect to a center of the compression coil spring in a longitudinal direction and
    the compression coil spring is inserted into the boss from a side of the close contact portion such that in the state where no load is placed on the compression coil spring, the center of gravity of the compression coil spring is arranged on a side of the first ratchet gear with respect to a tip end of the boss.

2. The ratchet mechanism according to claim 1,
    wherein one end and the other end of a wire member forming the compression coil spring are bent toward a center side of the compression coil spring in the longitudinal direction.

3. The ratchet mechanism according to claim 1,
    wherein the first ratchet gear and the second ratchet gear are made of resin.

4. An image forming apparatus comprising the ratchet mechanism according to claim 1.

5. The image forming apparatus according to claim 4 comprising:
    a frame and a side plate made of sheet metal which sandwich and hold the ratchet mechanism,
    wherein the compression coil spring is sandwiched between the second ratchet gear and the side plate,
    in the other end portion of the compression coil spring, an engagement portion is provided which is formed by bending the other end of a wire member forming the compression coil spring and
    on the side plate, an engaged portion is provided which is protruded to a side of the frame and is engaged with the engagement portion so as to regulate a rotation of the compression coil spring.

6. The image forming apparatus according to claim 4 comprising:
    an image carrying member on which an electrostatic latent image is formed,
    wherein the ratchet mechanism transmits a rotational drive force toward the image carrying member.

* * * * *